2 Sheets--Sheet 2.
W. H. PEDRICK.
Cotton-Harvesters.
No. 146,945. Patented Jan. 27, 1874.
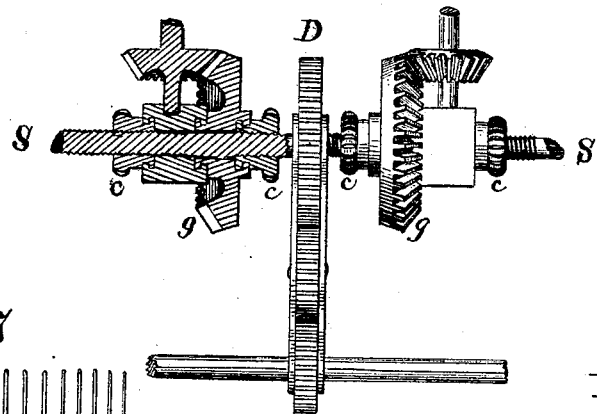
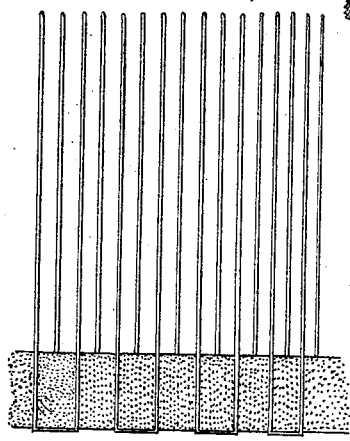
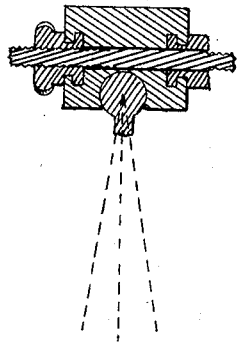
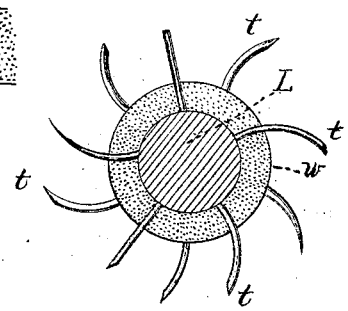
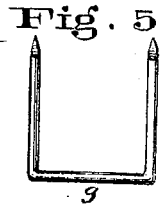

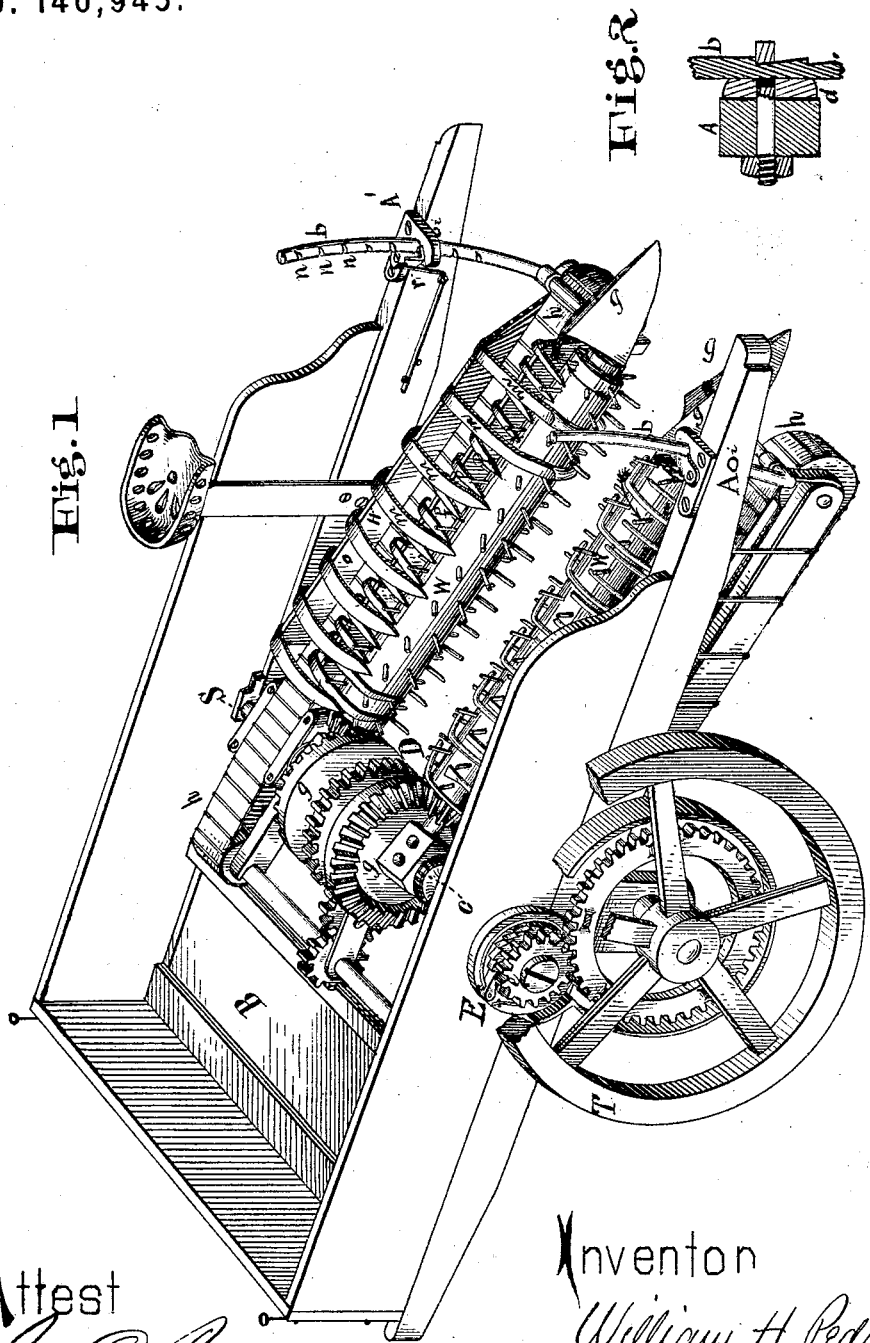

UNITED STATES PATENT OFFICE.

WILLIAM H. PEDRICK, OF RICHMOND, INDIANA.

IMPROVEMENT IN COTTON-HARVESTERS.

Specification forming part of Letters Patent No. 146,945, dated January 27, 1874; application filed August 20, 1873.

*To all whom it may concern:*

Be it known that I, WILLIAM H. PEDRICK, of Richmond, county of Wayne and State of Indiana, have invented certain new and useful Improvements in Automatic Cotton-Pickers, of which the following is a specification:

The object of my invention is to secure a machine wherewith cotton-plants may be stripped of their ripe cotton without material injury to the plants or to the unripe bolls.

The utility of my invention is manifest, in view of the well-known difficulty experienced by planters in many localities in gathering their cotton crop, owing to the scarcity or high price of labor.

In the drawings, Figure 1 is a perspective view, showing the top, front, and one side of my machine. Fig. 2 is a transverse section of an end of one of the shafts at A or A', Fig. 1. Fig. 3 is a plan view of the main shaft or axis S with the wheels, &c., pertaining to it. Fig. 4 is a transverse sectional view of one of the picking-cylinders, showing a few of the teeth, of the different shapes which may be used. Fig. 5 represents two of the teeth, $t\ t$, of the picking-cylinders, made from a single bent piece of wire. Fig. 6 represents the ball-and-socket joint at the upper extremity of the picking-cylinder. Fig. 7 shows a small portion of the picking-brush, consisting of long slender wire teeth forced through the rubber covering of the picking-cylinders, as shown on a different scale in Fig. 4.

The operation of my machine is as follows: It is drawn by two horses, which walk one on each side of the row of cotton plants to be picked. The gearing attached to the ground or driving wheels engages with the pinions $e$, which are attached to the shaft or axis S, upon which is the bevel-gearing $g$, which engages with that on the upper extremities of the picking-cylinders, and, as the machine is drawn forward, causes them to revolve in the direction indicated by the arrows. The guides I I, being in front of the picking-cylinders, pass one on each side of the stalks of the cotton plants and elevate the lateral branches. This elevation is continued by the cylinders on account of their oblique position, higher portions of the plants being caught between successively-higher portions of the cylinders, and any branches which strike the upper part of the machine at D being bent forward and caused to pass between the upper portions of the rollers. These rollers are furnished with teeth or brushes, which, by their forward and rotary motion, brush or remove the cotton from the open bolls, first at the bottom and then from successively-higher portions of the stalk, up to the top. The rollers or picking-cylinders have two adjustments: First, their lower extremities can be raised and lowered by means of the bars $b\ b$, which are attached to them by ball-and-socket joint, and are held in any desired position by means of ratchets which catch in the notches $n\ n$ cut at intervals in the bars. By means of this adjustment the ends of the guides and rollers may be lowered so as to pass under the lowest branches of the plants, or may be lifted up to any desired height above the ground. The second adjustment is a lateral one, by means of which the rollers may be brought near together; or they may be placed at any desired distance apart which will produce the best results. To effect this adjustment, the upper extremities are made to slide along the axis S in either direction, and are held in any desired position on that axis by means of the set-screws $c\ c$, while the lower extremities of the cylinders are adjusted to correspond with the upper extremities in the following manner: Shaft A is provided with a hole passing through it laterally, for the reception of an eye-bolt, which is held in place by means of a nut upon its outer end. The elevating-bar $b$, which is provided with notches on its face, passes up through the eye of this bolt, and thus, by means of blocks placed between it and the shaft, as shown in Fig. 2, may be set at any desired distance from the inner face of the shaft. When this mode of adjustment is adopted, the ratchet and its attaching device, seen in Fig. 1, may be dispensed with. The gearing on the rollers is secured to that on the axis S by means of double boxes, both ends of the rollers being secured in their places by means of ball-and-socket or globe joint, as represented in Fig. 6. The object of these globe-joints is that the upper and lower ends of the cylinders may be placed at different distances apart, when it is not desired that the cylinders should be parallel. As the machine advances, the picking-cylinders are caused to revolve in the direction indicated by the arrows, and the cotton in the open bolls is caught and detached from the plant by the teeth $t\ t$, and drawn between the ribs or teeth $m\ m$, these teeth being so close together that the trash of much size cannot be drawn through with the cotton. The branches, twigs, and leaves are by this means effectually separated from the cotton.

As the picking-cylinders continue to revolve the cotton is taken from off the teeth by the cleaning-combs P P, between the prongs of which the teeth of the rollers pass. The cotton thus laid on top of the combs is pushed along by the cotton which follows it until it falls over onto the automatic conveyers, $h\ h$, whence it is conveyed up and deposited in the box or other receptacle at the rear of the machine. The prongs or teeth of the combs are made to come quite near to the surface of the rollers, and may encircle them to a greater or less distance, as experience may show to be preferable. Instead of combs for removing cotton from the teeth of the picking-cylinders, revolving brushes may be used.

In picking cotton, it is highly important to secure it as free as possible from twigs, leaves, and other trash. This I accomplish by means of the trash breasts or guards H H, placed above the picking-cylinder teeth, at such a distance as will hold the trash of much size in check, while the teeth draw the cotton beneath it. These shields, may, if desired, be furnished at their edges with teeth $m\ m$, so arranged as to pass part or all the way around the picking-cylinders W W beneath which they may be fastened. At the sides between the two rollers, where the stalks pass, these teeth should be brought near the surface of the rollers, being made to pass between the picking-teeth. The breasts or guards may be much wider than shown in the figure, and may be made either with or without ribs or fingers, as described.

Some twigs, &c., are apt to be caught by the teeth, $t\ t$. They are prevented from being torn off from the plant by such a construction of the picking-cylinders as shall secure great elasticity of the teeth. In the form which I prefer, these cylinders consist of a solid core, L, surrounded by some elastic flexible material, as india-rubber, W, through which the teeth $t\ t$ protrude.

The teeth may be constructed at their base as shown in Fig. 5, two teeth being made of a single wire. When these are forced through the rubber W they are held in place by the connecting part $g$, which remains beneath the rubber, next to the solid core L. By this construction, great elasticity is secured for the teeth, the result of which is that when they catch hold of a hard unyielding surface or substance, as a branch or unripe boll, they will yield, and bend over until the impediment is passed and then spring into position again; whereas a soft substance, like the cotton of a ripe open boll, is readily secured by the picking-teeth, which have sufficient stiffness for that purpose, and delivered onto the comb, whence it is taken up to B by the elevators, as described. It may be possible for cylindrical brushes made with stout bristles to answer the purpose of those formed with wire, or wire and rubber, as described, in which case they would embody the spirit of my invention.

The elevators may be of any desired construction, as I do not claim them as my invention. One form is shown in Fig. 1, consisting of an endless belt to which slats are fastened. The teeth $t\ t$ of the picking-cylinders may be straight or curved, or otherwise bent. I find that the best results are obtained by using long slender wire teeth, as shown in Fig. 7. These also may be bent. At E, Fig. 1, is shown a ratchet-wheel and pawl, the object of which is that the road-wheels T may revolve backward, whenever the machine is backed, without setting in motion the axis S, and the machinery connected with it. It also facilitates turning.

What I claim as my invention, and wish to secure by Letters Patent, is—

1. The revolving cylinders W W provided with teeth inserted in an elastic substance to form elastic cylindrical strippers or pickers, substantially as specified.

2. The adjustable picking-cylinders, in combination with means for raising and lowering each separately, consisting of bar $b$, with notches $n\ n$ and ratchet $r$, substantially as specified.

3. In combination with the picking-cylinders, having their bearings adjustable on the axis S, the set-screws $c\ c$, or their equivalents, substantially as and for the purpose described.

4. The combination of the notched bar $b$, the blocks $d$, and the eye-bolt, or their equivalents, as a means of giving lateral as well as vertical adjustment to the lower end of the picking-cylinders.

5. As a means of separating the trash from the fiber or lint, the guards H H, placed above the comb P, and operating in combination with the toothed cylinders, substantially as specified.

6. In combination with the picking-cylinders of an automatic cotton-picker, a ball-and-socket joint at the end of such cylinders, as and for the purpose set forth.

WILLIAM H. PEDRICK.

Witnesses:
 TIMOTHY NICHOLSON,
 JOHN B. DOUGAN,
 WM. B. HADLEY.